(12) United States Patent
Huang et al.

(10) Patent No.: US 6,959,319 B1
(45) Date of Patent: Oct. 25, 2005

(54) SYSTEM AND METHOD FOR AUTOMATICALLY PERSONALIZING WEB PORTALS AND WEB SERVICES BASED UPON USAGE HISTORY

(75) Inventors: Anita Wai-Ling Huang, San Francisco, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/659,558

(22) Filed: Sep. 11, 2000

(51) Int. Cl.[7] .................................... G06F 15/16
(52) U.S. Cl. ................ 709/203; 709/224; 709/229; 705/14; 707/10
(58) Field of Search .................... 709/203, 245, 709/217–219, 224, 229; 707/10; 705/14, 705/27

(56) References Cited

U.S. PATENT DOCUMENTS

| | | | |
|---|---|---|---|
| 5,727,129 A * | 3/1998 | Barrett et al. ................. | 706/10 |
| 5,754,939 A | 5/1998 | Herz et al. | |
| 5,835,087 A | 11/1998 | Herz et al. | |
| 5,887,133 A | 3/1999 | Brown et al. | |
| 5,918,013 A | 6/1999 | Mighdoll et al. | |
| 5,953,017 A * | 9/1999 | Beach et al. ................. | 345/440 |
| 6,009,410 A * | 12/1999 | LeMole et al. ................ | 705/14 |
| 6,014,638 A * | 1/2000 | Burge et al. ................... | 705/27 |
| 6,131,110 A * | 10/2000 | Bates et al. ................. | 709/203 |
| 6,381,651 B1 * | 4/2002 | Nishio et al. ................ | 709/245 |
| 6,460,036 B1 * | 10/2002 | Herz ............................ | 707/10 |
| 6,853,982 B2 * | 2/2005 | Smith et al. ................... | 705/27 |

* cited by examiner

Primary Examiner—Wen-Tai Lin
(74) Attorney, Agent, or Firm—Mark McCabe, Esq.; McGinn & Gibb, PLLC

(57) ABSTRACT

A method of customizing a web page by sensing a user's access of objects included in the web page or objects that are specified by the user in advance, wherein by "access" it means using the functions provided by the objects after they are locally displayed. The web page is customized in such a fashion that only the objects that have been used for a predetermined number of times or the pre-specified objects that have been used for the predetermined number of times would be included in a web page for the user's subsequent visits.

43 Claims, 11 Drawing Sheets

FIG. 1 the world's online marketplace

Specialty Sites
Automotive
Business Exchange
Great Collections
Half.com (an eBay company)

Global Sites
eBay Australia
eBay Canada
eBay Germany
eBayJapan
eBay United Kingdom

300 welcome new users
- new to eBay?
- register
- how do I bid?
- how do I sell?
- Why eBay is safe Celebrate Summer with beach BBQ, and more!
The T206 Wagner, baseball's most valuable card.

Local Trading
Appliances  Furniture
Electronics  Real Estate
Sporting Goods  *more...*
Pick a region ▽ Go!

Browse by Themes
Games
Great Outdoors
Movies
All Themes ▽ Go!
*more...*

Don't Miss...
Rosie

Charity
Bid for a good cause!

Featured Items  *all items...*

*all gallery items...* | *all featured items...*

Forget Dieting!! April Lost 100lbs With Access.PKG(4) ~~250~~ Samsung 3500 HOT!!
"Triple Crown" Baseball SLOT MACHINES Blowout
2 Air Tickets ~Hawaii~or~Fly Worldwide $19.95
Epson Ink Sets Get Both A Blk & Clr For $9.95
Airfare $19.99 Bonus Hotel Bahamas Vegas ?
*all featured items...*

Sellers! Billpoint is FREE with VISA

ORIGINAL PAGE

FIG. 3

SYSTEM AND METHOD FOR AUTOMATICALLY PERSONALIZING WEB PORTALS AND WEB SERVICES BASED UPON USAGE HISTORY

BACKGROUND OF THE INVENTION

1. Field of the Invention

The present invention relates to a world-wide network (e.g., the Internet), and more particularly to a system and method for automatically personalizing web services based upon individual user usage history.

2. Description of the Related Art

The World-Wide-Web is increasingly becoming a medium for accessing traditional services and conducting business rather than just browsing information. People visit web sites, such as Amazon.com, Ebay.com, Yahoo.com, Priceline.com, etc., to obtain these various services, such as to shop for books, to participate in auctions, to check for stock quotes and to access search engines.

Sets of one or more of these services are provided through Web sites (or portals). Besides offering these services, typical portal sites also provide other information, such as advertisements, links to related sites, and so forth. Most users who access these sites typically do not care about all of the services and information offered them. By contrast, they normally access the portal to obtain specific services. This means that the user typically will click only on relevant links and enter information only into the search boxes that are useful to him or her. Hence, a user who repeatedly visits a portal site will normally use only part of the site. Repeated visits can show exactly what parts of the site the user normally accesses.

Browsers are unaware of these user usage patterns for specific portal sites. Hence, a browser will display all of the contents of a portal site to a user whether or not the content is of use to him or her. This irrelevant display of information greatly hinders users, especially if they depend on devices with limited form factors (e.g., handheld devices, voice browsers, etc.) or with low bandwidth connections. Conventional systems repeatedly download, process, and display information that will never be used. Thus, they waste the resources of the browser, slow down the user's system, and take up unnecessary bandwidth by displaying irrelevant content. This mode of operation makes the user's "Web session" inefficient.

In addition to hindering users with these types of devices, the extraneous information of web pages also acts as a barrier to accessibility for people with disabilities. For example, blind users who rely on text-browsers must process the information on a page word-by-word. Hence, it is often difficult for them to locate specific sections of the page to obtain the services of interest. As another example, users with cognitive handicaps often find it difficult to process all of the information and media in a page at once. Hence, by displaying the irrelevant information on a page, these users face unnecessary difficulties in executing their desired transactions.

SUMMARY OF THE INVENTION

In view of the foregoing and other problems, disadvantages, and drawbacks of the conventional methods and structures, an object of the present invention is to provide a method and structure to enable a browser to display information in a way that better suits a user's usage patterns, thereby making a Web session more efficient for the user.

Another object of the present invention is to provide a system and method that enable a user to explicitly specify to a browser the specific entries (or classes of objects) that the user wants to access when he or she accesses specific Web sites.

Yet another object of the present invention is to provide a system and method that enable a browser to selectively display the contents of a Web site to the user based on the user's explicit specifications.

A further object of the present invention is to provide a system and method that track a user's repeated visits to Web sites and determine the user's usage patterns by tracking the specific entries (or classes) that the user selectively interacts with (e.g., clicks on or enters input into).

Another object of the present invention is to provide a system and method that enable a user to specify to the browser threshold values for the frequency that a user accesses specific websites to determine what classes of objects that the user wants to access when he or she accesses specific Web sites.

Yet another object of the present invention is to provide a system and method for a browser to use the information of the user's usage pattern history and the thresholds that a user specifies to selectively display the contents of a Web site to the user.

A still further object of the present invention is to provide a system and method for a browser to use the information of the user's usage pattern history and default threshold values for frequency to selectively display the contents of a Web site to the user.

In a first aspect of the present invention, a method (and system) of displaying predetermined objects on a web page accessed by a user includes displaying only those objects that the user has specified in advance.

In a second aspect, a method (and system) of selectively tracking web service usage by a user includes sensing a number of times a user visits a website, sensing a number of times a user interacts with a class of elements on the website by the number of times the user accesses links that belong to the class, and displaying only those objects that belong to a class that the user accesses a predetermined number of times.

A program storage device is also provided for storing the inventive methods of the present invention.

With the unique and unobvious aspects and features of the invention, it is unnecessary for the browser to display contents that will not be of immediate interest to the user. In other words, as the user repeatedly visits sites of interest and selectively uses entries, or if the user explicitly specifies to the system the entries of interest, the browser can determine what parts of the Web site to display to the user and in what order. Thus, if the user is using a device with limited form factor or is on a slow bandwidth connection, a more efficient Web session will result as the resources of the browser will not be wasted on irrelevant objects, and the user's system and display of relevant contents will not be unnecessarily slowed.

Moreover, if the user faces other challenges to web accessibility (for example, as a result of other alternative access strategies (voice access, etc.) or cognitive and/or physical disabilities), the system can personalize Web sites to suit the user's requirements. Moreover, if the user has limited time to access web resources, the invention allows for a more efficient browser because the user will 110 not have to sift through information on the Web site that is not relevant to the user's goals.

BRIEF DESCRIPTION OF THE DRAWINGS

The foregoing and other purposes, aspects and advantages will be better understood from the following detailed description of a preferred embodiment of the invention with reference to the drawings, in which:

FIG. 1 shows a screen display of a "Home page" 100 of an exemplary website;

FIG. 3 shows the rest of the home page of the website of FIGS. 1–2;

DETAILED DESCRIPTION OF PREFERRED EMBODIMENTS OF THE INVENTION

Figure 1:
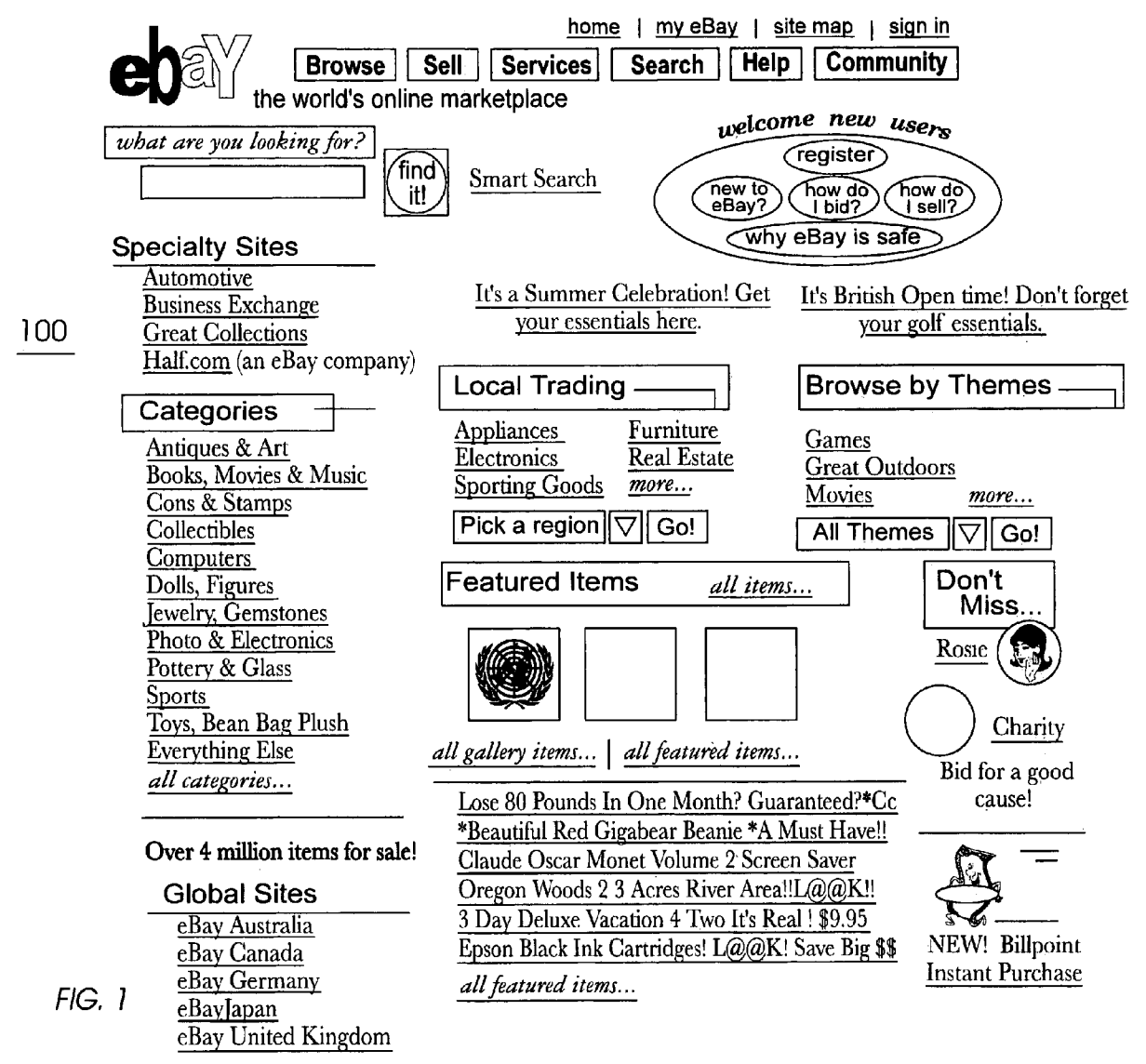
Figure 2:
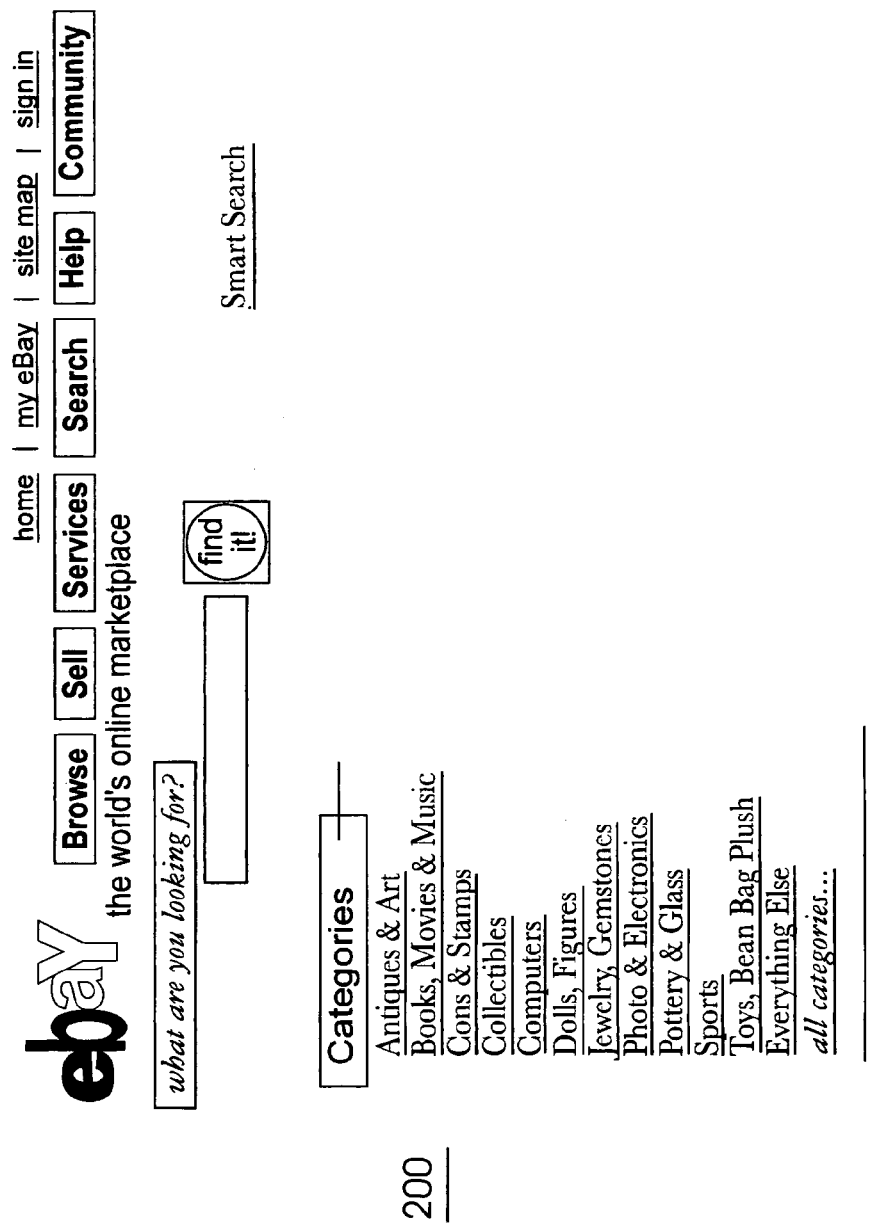
FIG. 2 shows the frequently used structures search box and categories that are listed on the home page of the website of FIG. 1.

Referring now to the drawings, and more particularly to FIGS. 1–10, there are shown preferred embodiments of the method and structures according to the present invention.

Generally, with the invention, a user visits a web service by typing in the Universal Resource Locator (URL) of the site (e.g., www.ebay.com or www.amazon.com, etc.) and the home page 100 of the website is launched (e.g., see FIG. 1) for display on the user's monitor.

Upon arriving at (e.g., obtaining) the home page 100, the user performs his or her typical operations. These include clicking on some major links on the site, entering text into a search box, checking a set of checkboxes, etc. The system monitors these inputs and keeps a history of the user's visit to the sites.

With the unique and unobvious aspects of the present invention, if the number of visits is determined to exceed a threshold (or if the user has manually registered the user's preferences to the system), the next time the user visits the site, the user sees (obtains) a version of the site that has been customized to the user's previous visits or the user's explicit specifications. This way the user's browser need not download text and graphics that will not be used (or is typically not used) by the user. Only the content of the services (e.g., text and graphics representing the services) that the user uses frequently are displayed.

The invention is preferably implemented using a Proxy server, even though other alternatives, such as server-side filtering or client-side filtering, are possible. Hereinbelow, for ease of the reader's understanding and clarity, details of the inventive system architecture and its operation are provided assuming a Proxy server is used. For purposes of the present application, a "proxy server" is defined as a unit which "sits" between (e.g., is intermediate to) a client browser and a service provider, and which intercepts a document being sent from/to a client browser and the service provider.

In operation, first, the user registers his/her browser with the proxy server. The proxy server has a set of static configuration specifications that allow the user to specify which web services require filtering. For example, the user may specify to the proxy server that Web sites with host names "www.ebay.com" and "www.amazon.com" require filtering. The user can then specify in the browser that the browser should go through the proxy server when visiting these sites. This allows the user to register sites like www.amazon.com, or www.ebay.com with the proxy server, so that the proxy-server may track the usage pattern and customize the Web sites in subsequent visits.

Figure 5A:
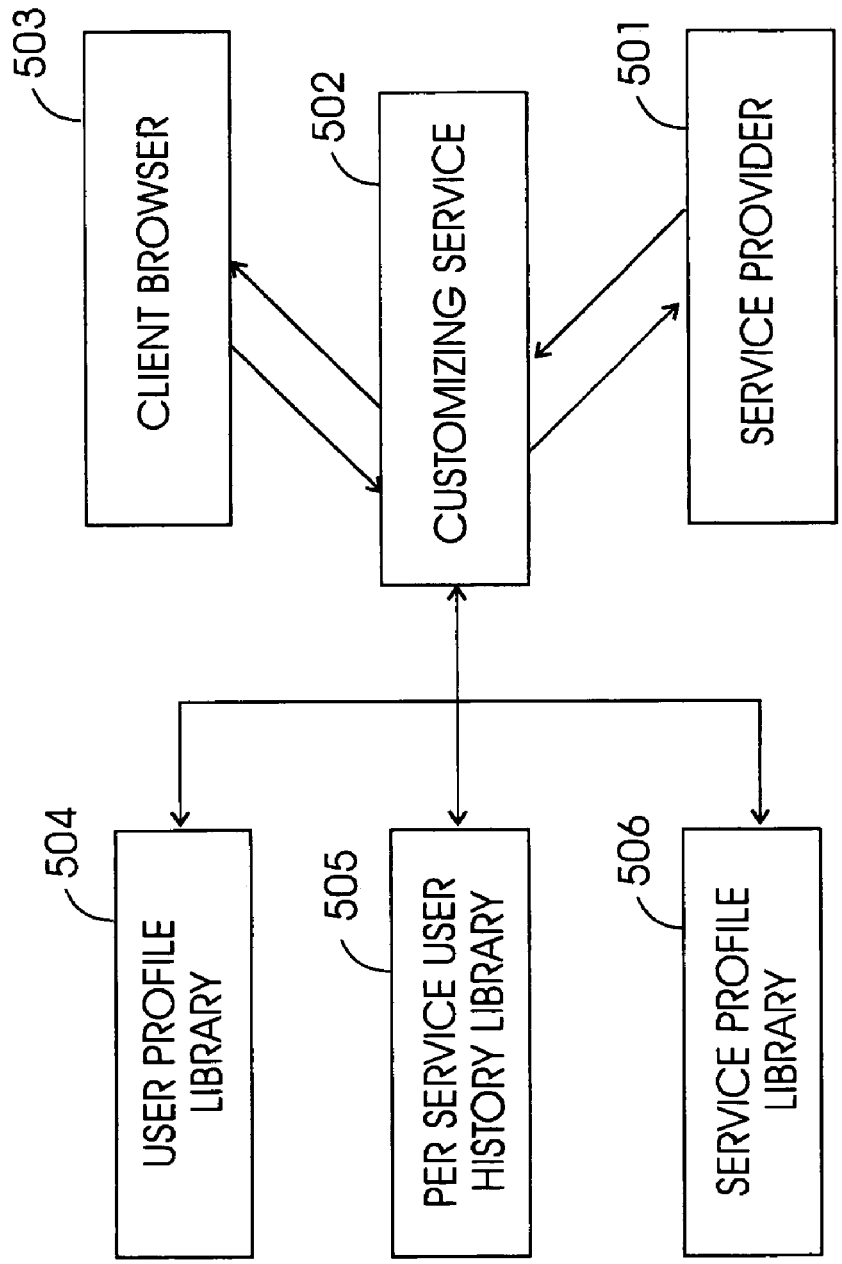
FIG. 5A shows an architecture diagram of the environment of the present invention.

When the user tries to access one of the registered sites from the browser, the downloaded page is intercepted by the proxy server (e.g., customizing service 502 shown in FIG. 5A).

The proxy server intercepts the page and examines the structural information on the page. Since web pages are hypertext markup language (HTML) pages, the customizing service can use the structural information of the page to classify its contents according to objects (i.e., different services or classes). It is noted that other language structures for the pages can be used such as Extensible Markup Language (XML).

Thus, the customizing service, in the proxy server, keeps the structural grouping of the links and data in the page in it. For instance, for the http://www.ebay.com, the website looks as shown in FIG. 1. The page 100 is divided (e.g., has areas apportioned to various classes) into about eight classes: search box, welcome, hot picks, categories, featured items, local trading, specially sites other links, etc. The search box allows one to search for an auction item. The welcome class introduces the user to eBay and shows them how to participate in an auction, the categories provide a classification based view of the site, the featured items class shows some hot new items on sale, and so on.

A regular visitor to eBay may be interested in only two out of these six classes (e.g., the search box, and the categories). Being familiar with the site, the regular visitor does not need to access instructions on how to make bids in the auctions, does not want to access information about local trading, etc. For this user, it would be unnecessary to download these structures since the user is not interested in them. Occasionally, however, the user may still visit other structures, e.g., "featured item."

The inventive system places only the links and structures that the user most frequently visits on the front (home) page and makes the other information available on separate pages through one or more links. Thus, the page 100, customized for use for the regular visitor to eBay in the previous example, would appear as shown in FIG. 2 as a customized page 200. After tracking the user's usage history, the customizing service determines that the user uses the two classes search box and categories more frequently than the other classes. Hence, when it intercepts the page, it filters out the other classes and returns the page 200 in FIG. 2, which only contains the frequently used classes.

In FIG. 2, the rest of the original page is stored one link away because these other classes are not typically used by the user. If, on rare occasion, the user decides to visit one or more of these classes, the user can click on the link "rest of page" to access the less frequently used classes, which appear on the page 300 shown in FIG. 3. This second page (e.g., page 300) has a new link (e.g., "original page") that allows the user to retrieve the original home page (without any filtration by the customizing service).

As another feature, since the system monitors the hierarchical nature of the page, the system is able to provide a link per class (e.g., separate links to specialty sites, featured items, welcome, etc.) rather than a single link to all of these classes. In other embodiments, the system can also generate a hierarchy of these links based on usage history. For example, if the user accesses specialty items more frequently than featured items, welcome, etc., the system can generate a page that contains the class specialty items one link away and, from that page, a separate link to go to the rest of the classes.

Figure 4:
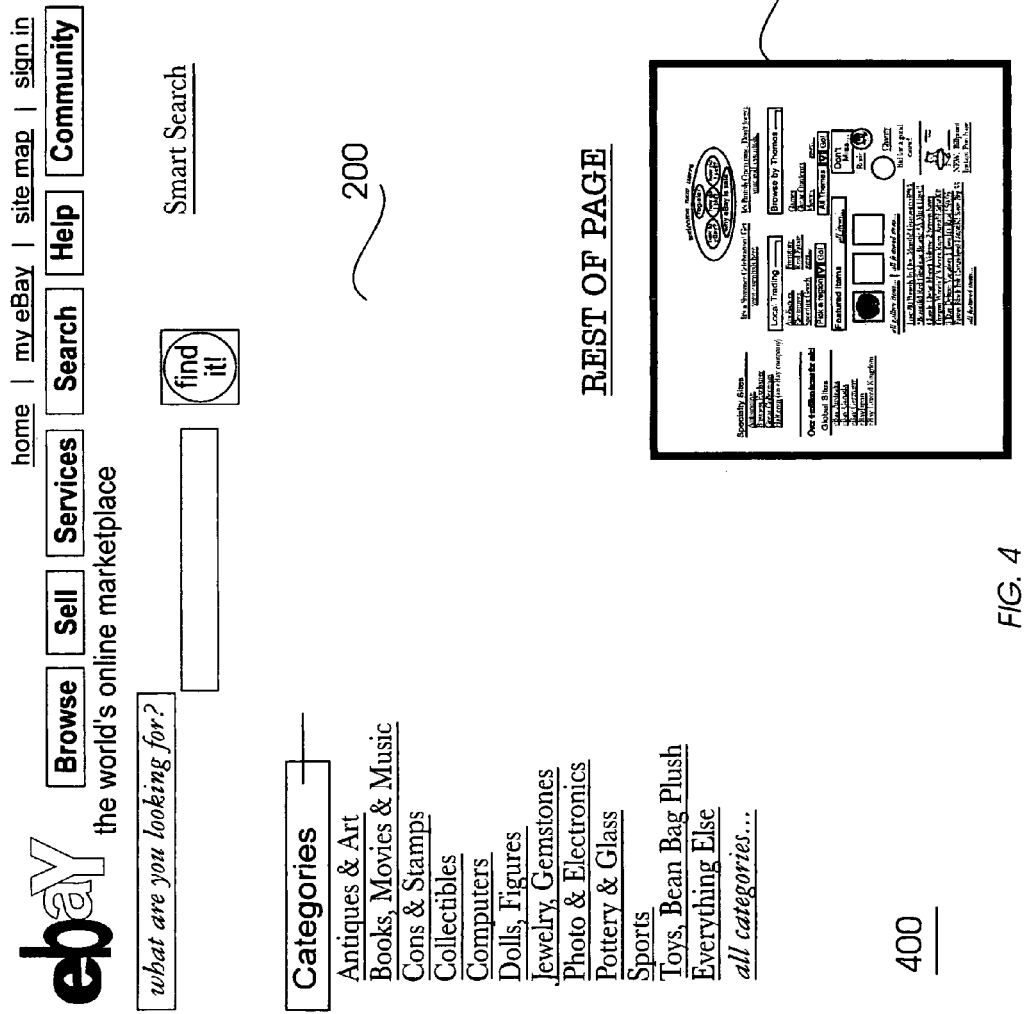
FIG. 4 shows the converted home page and the rest of the page of FIGS. 1–3.

Another function that may be provided by the customizing service is to create of an icon that represents an image of the rest of the page or each individual class of the page that has been filtered out of the home page. The customizing service can use this icon as the anchor to the hyperlink that leads to the page that contains these classes. As a result, the user can get an idea of what the rest of the page looks like and whether it is worth visiting or not, as shown in the page 400 of FIG. 4. FIG. 4 shows the converted front page 200 (FIG. 2) with a hyperlinked icon that shows what the rest of the page 300 looks like (FIG. 3).

FIG. 5A illustrates a preferred environment of the architecture of the present invention. The architecture preferably includes a service provider 501, a customizing service 502 operatively coupled to the service provider 501, a client browser 503 operatively coupled to the customizing service 502, a user profile library 504 coupled to the customizing service, a per service/user usage history library 505 coupled to the customizing service, and a server profile library 506 coupled to the customizing service.

The service provider 501 is a Web server that provides the pages of the service. For example, an eBay server acts as the service provider for the eBay Web site. The client browser 503 may be any client web browser such as Netscape Navigator® or Internet Explorer®. The customizing service 502 may operate through a third party proxy-server, through a client system or through a server system. The customizing service 502 intercepts pages from the service provider 501 and filters them according to the methods of the present invention. The customizing service 502 returns the filtered pages to the client browser 503 for interaction with the user.

A user may connect to the customizing service 502 through the client browser 503 to specify a user profile 504. The user profile 504 tells the customizing service which service sites to filter, the elements to include and exclude from each service site, and threshold values of frequency to automatically determine which elements to filter in the service site. For each user, the customizing service 502 keeps track of these properties in a user profile. The user profile library 504 is a database that contains the user profiles for all users.

The customizing service 502 intercepts requests from the client browser 503 to track and build the usage history for each user for each service. The per service/user usage history library 505 contains the usage history records for each user for each service. Additionally, the customizing service 502 keeps track of the hierarchical relationships within the web pages of a service site (e.g., what page elements (links, etc.) belong to what classes) in a service profile for each service. The service profile library 506 contains the service profiles for all available services.

Ultimately, the customizing service 502 uses the information in the user profiles, from the user profile library 504, in the per service/user usage history records, from the per service/user usage history library 505, and from the service profiles, from the service profile library 506, to determine if and how to filter each page provided by the service provider 501.

Figure 5B:
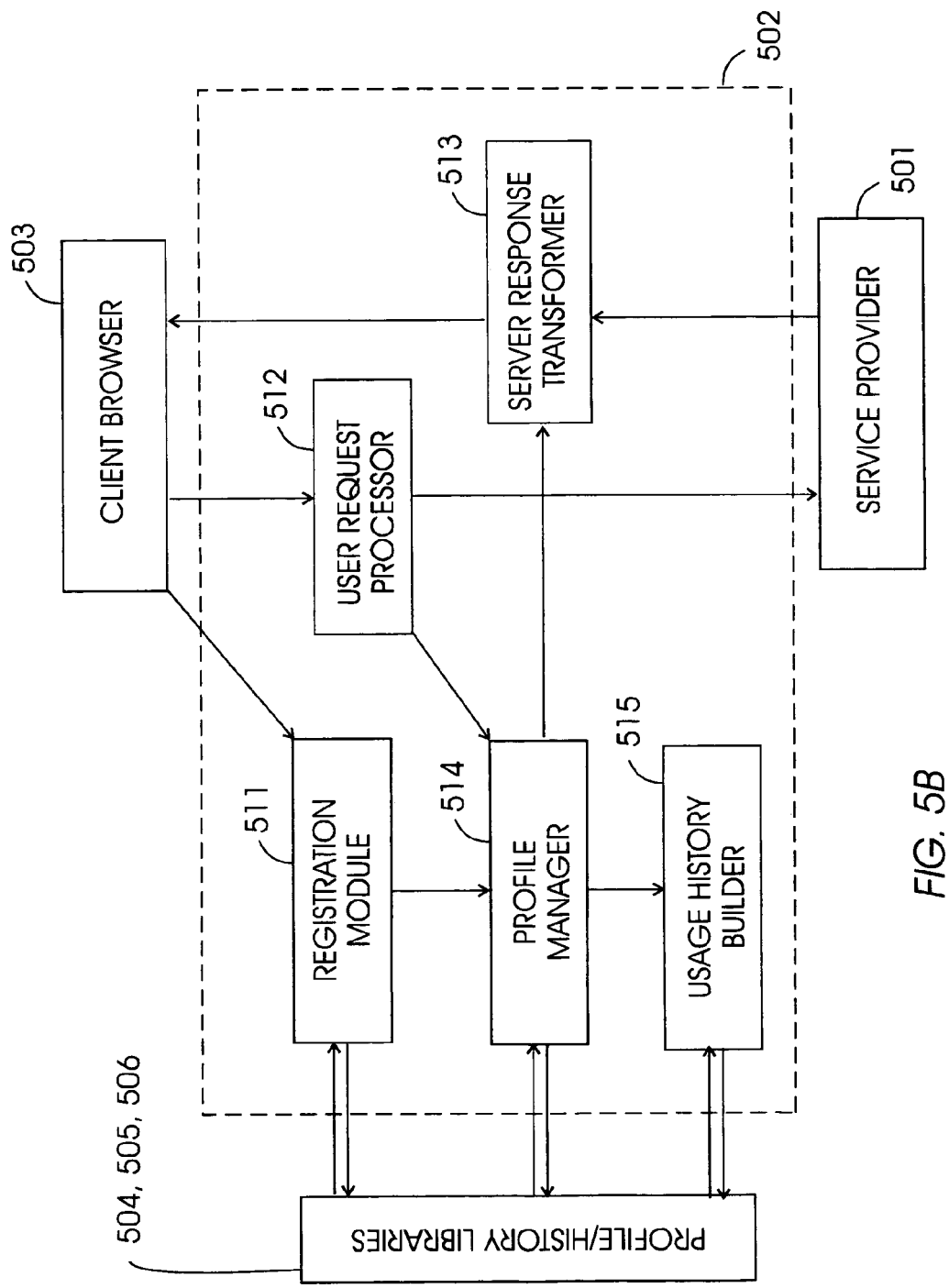
FIG. 5B is a block diagram schematically illustrating a customizing service (e.g., within a proxy server) 502 of the architecture shown in FIG. 5A.

FIG. 5B is a block diagram schematically illustrating a customizing service (e.g., within a proxy server) 502 of the architecture shown in FIG. 5A. As shown, the customizing service 502 includes a registration module 511, a user request processor 512, a server response transformer 513, a profile manager 514, and a user history builder 515.

The registration module 511 is communicatively linked to the client browser 503. A user connects to this browser to generate a user profile, as described below in FIG. 6. The registration module 511 processes the input by the user and sends it to the profile manager 514. The profile manager 514 stores the information in the user profile library 504.

In a usage scenario, the user request processor 512 intercepts user requests from the client browser 503. The user request processor 512 sends the request to the profile manager 514.

The profile manager 514 obtains the user profile, service profile, and per service/user usage history profile for the service and user and determines if and how to filter the requested web page. The profile manager 514 sends the result of this computation to the server response transformer 513. If the user profile indicates that the service should be filtered, the profile manager 514 forwards the user request to the user history builder 515.

The user history builder 515 obtains the service profile and per service/user history profile for the service and the user and updates the per service/user history profile with the received user request. In all cases, the user request processor 512 forwards the user request to the service provider 501 to obtain a service response from the web server.

The service response transformer 513 intercepts the response from the service provider 501. The service response transformer 513 also receives information from the profile manager 514 to indicate if and how the response should be filtered. The service response transformer 513 uses the information that was received from the profile manager 514 to transform the received response (web page). The service response transformer 513 returns the transformed page to the client browser 503.

Figure 6:
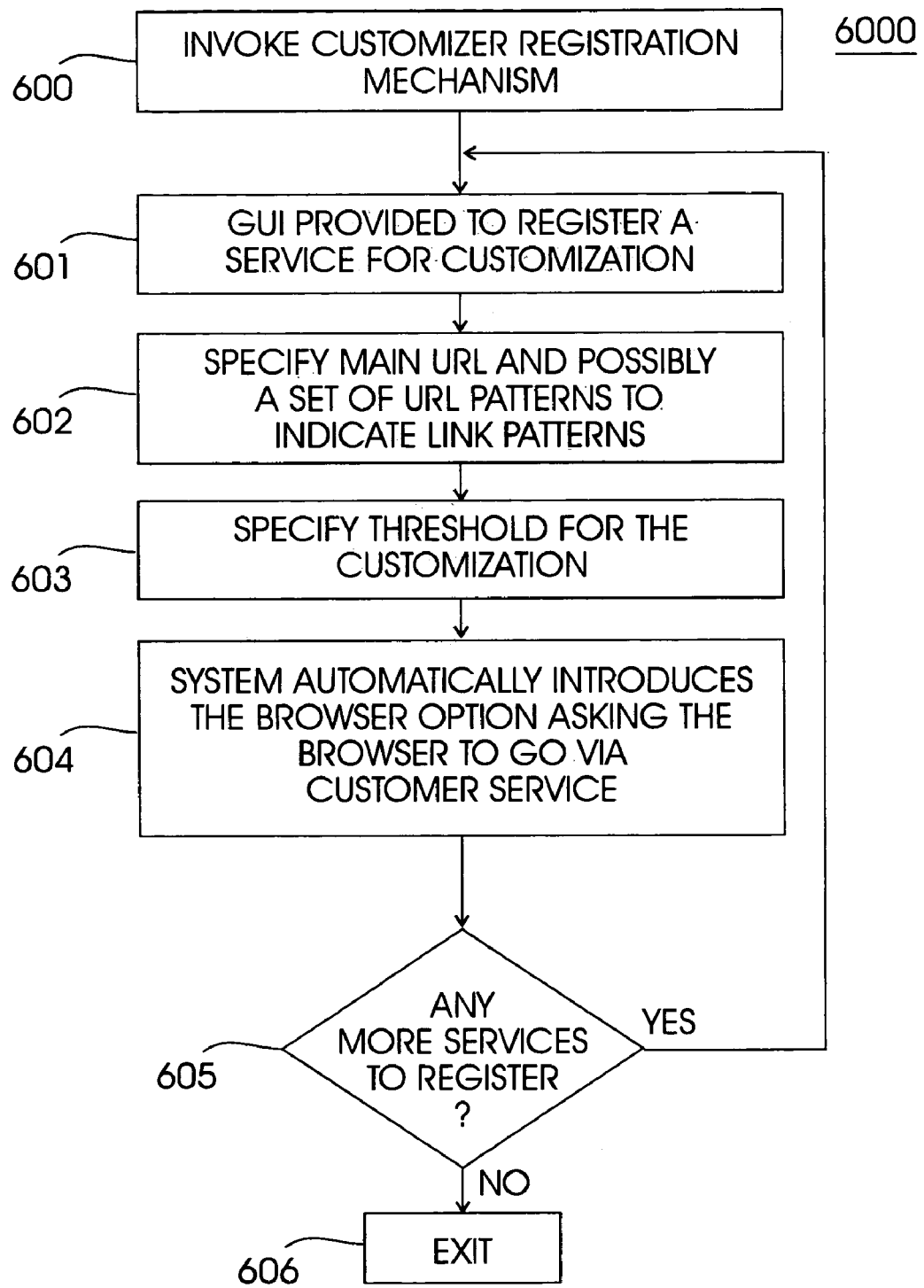
FIG. 6 is a flow diagram of the method 6000 according to the present invention in which the user invokes the customizer registration mechanism.

FIG. 6 is a flowchart of a method 6000 for registering user information and service with the customizing service. This process is carried out by the registration module 511 to build the user profile.

First, in step 600, the user invokes the registration module 511 of the customizing service 502. In one embodiment, the registration module 511 provides the user with a graphical user interface (GUI) to register a service for customization (step 601).

In step 602, the user registers a service by specifying its main URL (and possibly/optionally a set of URL patterns to indicate link patterns from this service).

In step 603, the user specifies the threshold (e.g., how many accesses) for the customization. The threshold serves to inform the system after how many uses of the web service the system should start filtering and customizing the service for the user.

In step 604, the system automatically introduces into the browser options, asking the browser to go via the customizer service when accessing the URL for the service that the user specified.

In step 605, it is determined whether there are any more services to register. If it is determined that there are more services to register (e.g., a "YES" in step 605), then the process loops to step 601 and the user registers another service(s) for customization. Otherwise, the process terminates in step 606.

Figure 7:
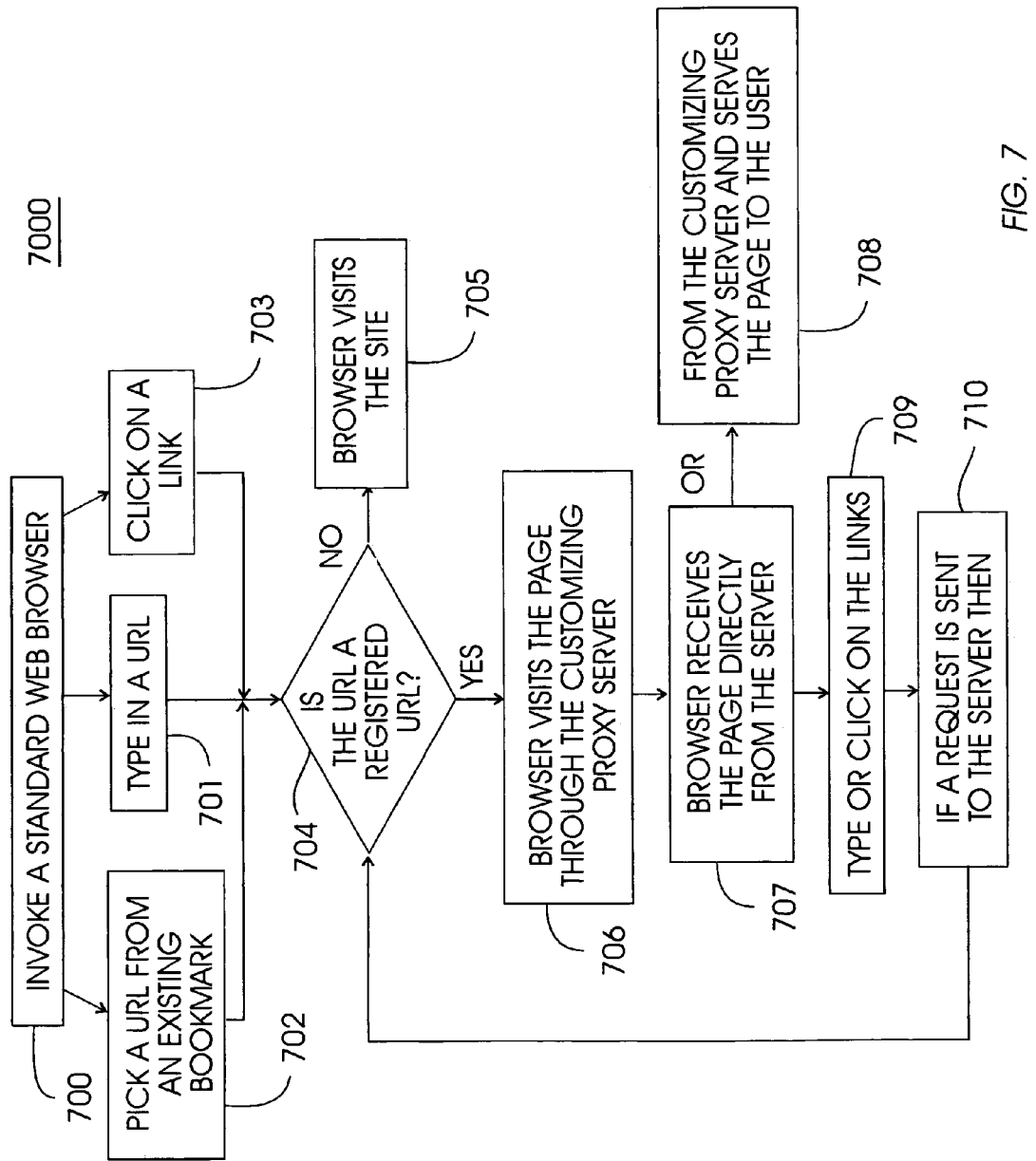
FIG. 7 is a flow diagram of a method 7000 of the present invention illustrating the usage scenario.

FIG. 7 is a flow diagram which illustrates a method 7000 of the usage scenario. First, in step 700, the user invokes a standard web browser.

Thereafter, the user either types in a URL (step 701), picks a URL from an existing bookmark (step 702), or clicks on a link (step 703).

In step 704, it is determined whether the URL is a registered URL by, for example, comparing the URL to a storage (e.g., database) storing previously registered URLs and users. If the URL is not a registered URL as determined in step 704, then the browser merely visits the site as is conventional in step 705.

However, if the URL is a registered URL as determined in step 704, then the browser visits the page through the customizing proxy server (step 706).

Thereafter, the browser receives the page either directly from the server (step 707) or from the customizing proxy server (step 708) and serves the page to the user.

Then, in step 709, the user uses the page by typing in, or clicking in on the links. Thereafter, if a request is sent to the server (step 710) by the user either clicking on the link or typing in a text, then the process loops back to step 704 to determine whether the new URL is a registered URL.

Figure 8:
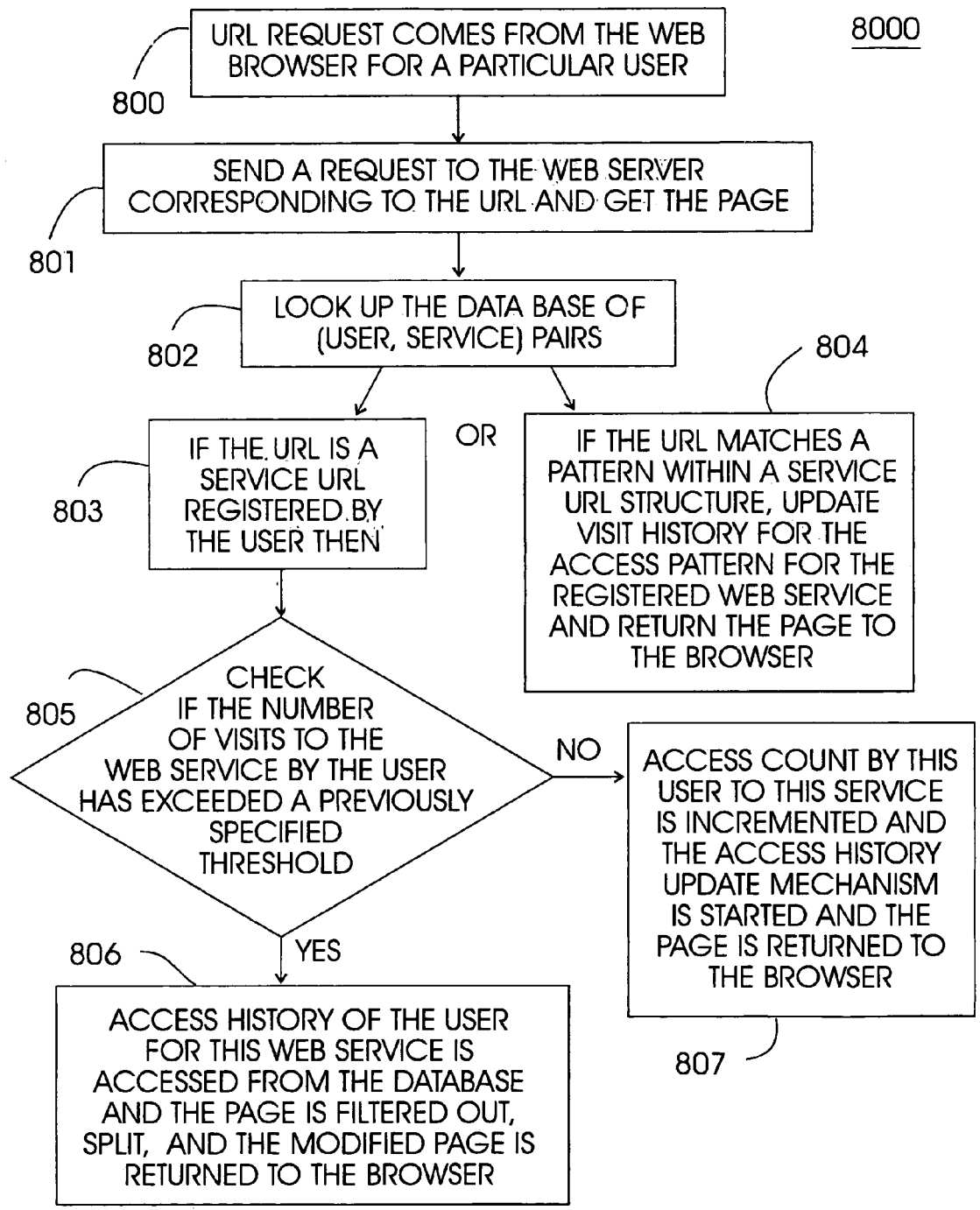
FIG. 8 is a flow diagram of a method 8000 which illustrates a customizing service within a proxy server (e.g., a customizing service 502 shown in FIG. 5B) according to the invention.

FIG. 8 is a flow diagram for a method 8000 for a customizing proxy server.

First, in step 800, a URL request comes from the web browser of a particular user. In step 801, a request is sent to the web server corresponding to the URL and the page is obtained.

In step 802, the database of (user, service) pairs is searched for the URL.

If the URL is a service URL registered by the user (step 803), then in step 805, the number of visits to the web service by the user is checked to determine whether the number has exceeded a previously specified threshold.

If the number of visits exceeds the threshold (e.g., a "YES" in step 805), then in step 806 the access history of the user for this web service is accessed from the database and the page is filtered out, split, and transformed based upon this access history, and the modified page is returned to the browser.

If the number of visits does not exceed the threshold (e.g., a "NO" in step 805), then in step 807, then the access count by the user to this service is incremented and the access history update mechanism is started and the page is returned to the browser.

It is noted that, after step 802, if it is determined that the URL is a URL matching a pattern within a service URL structure, then in step 804 the visit history for the access pattern for the registered web service is updated and the page is returned to the user's browser.

For each web service URL the system stores an XML document representing the structure of that document, as part of the per service/user profile. For instance, for the www.ebay.com page, the corresponding structure document stored in XML will looks as follows:

```
<service name = "ebay"
    url = "http://www.ebay.com>
<classes>
    <class name = "categories" type = "link" occurrence = "fixed">
        <entry name = "antiques" link = "antiques-index.html"/>
        <entry name = "Books, Movies, Music" link =
        "books-index.html"/>
        . . .
</class>
</class name = "your personal trading community" type = "search box">
        <entry/>
    </class>
    <class name = "featured items" type =
    "link" occurrence = "variable"/>
    . . .
</classes>
</service>
```

The above XML document specifies the structure of the www.ebay.com page. Three classes are shown in the example, "categories", "search box" and "featured items". The type attribute specifies whether the class consists of links or a search box or some other HTML entity. The occurrence attribute specifies if the links are fixed or variable across visits to the page. Typically "categories" rarely change and can be classified as fixed, whereas "featured items" items frequently change.

As the user visits the website repeatedly, this document is updated to specify which parts of the page structure were accessed. For instance, suppose the user has visited ebay.com 20 times, during which he used the "categories" part 15 times of which "Books, Movies, Music" were accessed 10 times, and "Antiques" were accessed 5 times, none of the other "categories" was used; the "search box" was used 18 times, and the "featured items" was never used. The document will be updated as follows to reflect the visitation.

```
<service name = "ebay"
    url = "http://www.ebay.com" visits = "20">
<classes>
    <class name = "categories" type = "link" occurrence =
    "fixed" visits = "15">
        <entry name = "antiques" link =
        "antiques-index.html" visits = "5"/>
        <entry name = "Books, Movies, Music" link =
        "books-index.html"
    visits = "10"/>
    . . .
    </classes>
    <class name = "your personal trading community"
    type="search box"visits = "18">
        <entry/>
    </class>
    <class name = "featured" type =
    "link" occurrence = "variable" visits = "0"/>
    . . .
</classes>
</service>
```

Suppose the user uses "20" as the threshold count for this site and visits the site, the $21^{st}$ time. When the user visits the site the user will be shown an ebay.com page with only "categories" and "search box" visible with the "categories" showing only two links "antiques" and "books, movies, music". This page will also have one or more additional links to the rest of the page.

Figure 9:
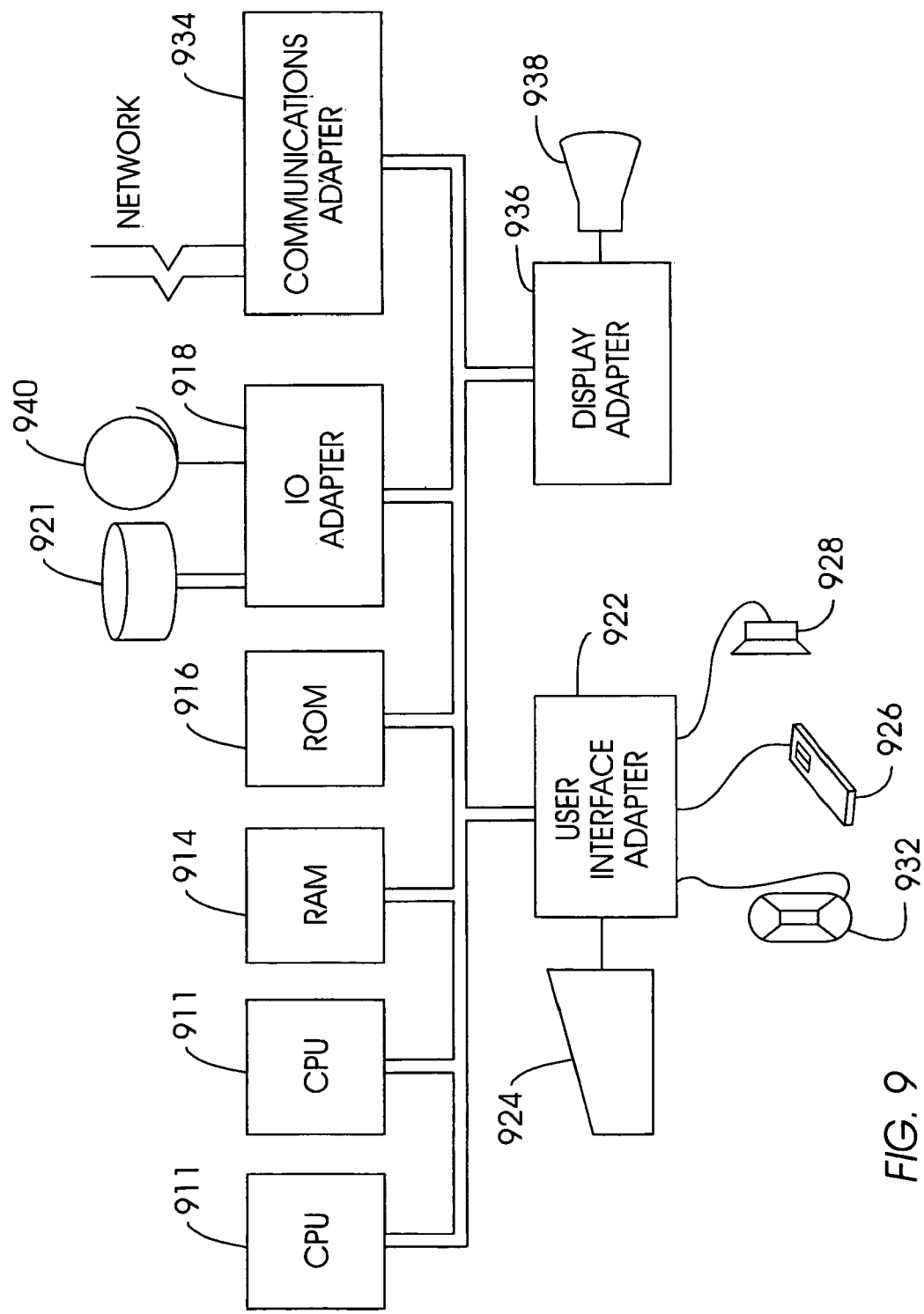
FIG. 9 illustrates an exemplary hardware/information handling system 900 for incorporating the present invention therein.
Figure 10:
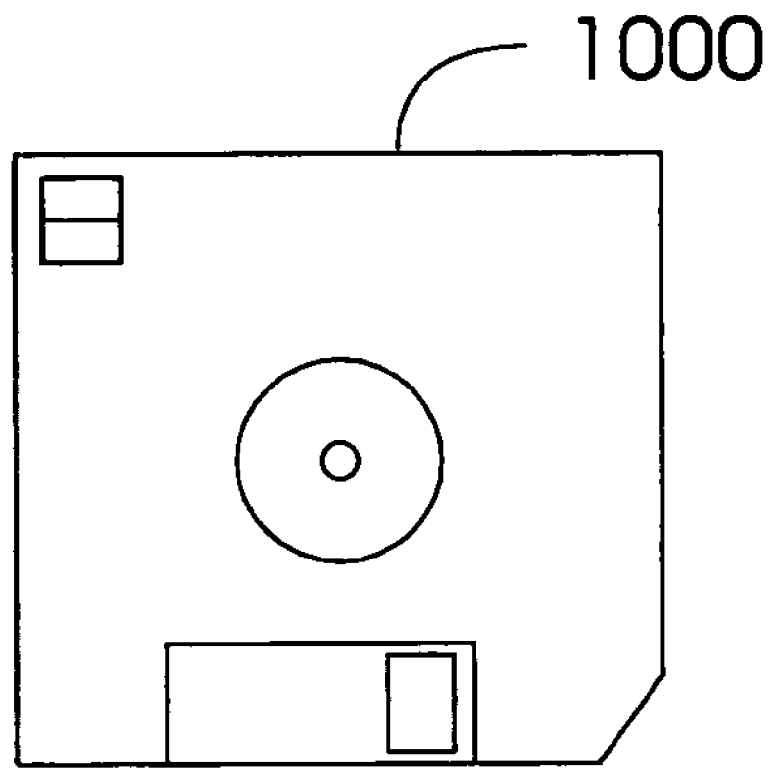
FIG. 10 illustrates a signal bearing medium 1000 (e.g., storage medium) for storing steps of a program of a method according to the present invention.

FIG. 9 illustrates a typical hardware configuration of an information handling/computer system in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

This signal-bearing media may include, for example, a RAM contained within the CPU 911, as represented by the fast-access storage for example. Alternatively, the instructions may be contained in another signal-bearing media, such as a magnetic data storage diskette 1000 (FIG. 10), directly or indirectly accessible by the CPU 911.

Whether contained in the diskette 1000, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While a preferred embodiment of the present invention has been described above, it should be understood that it has been provided as an example only. Thus, those skilled in the art will recognize that the invention can be practiced with modification within the spirit and scope of the appended claims.

Having thus described our invention, what we claim as new and desire to secure by Letters Patent is as follows:

1. A method of displaying predetermined objects on a web page accessed by a user, comprising:

one of displaying only those objects of said web page which said user has accessed a predetermined number of times previously, and displaying only those objects of said web page which said user has specified in advance, wherein if at least one of a number of visits to a web site is determined to exceed said predetermined number of times and if the user has specified the user's preferences in advance, the next time the user visits the site, the user obtains a version of the site that has been customized to the user's previous visits, such that a browser of the user does not download text and graphics that are not used by the user said predetermined number of times.

2. The method of claim 1, further comprising:

sensing a number of times a user visits a website; and sensing links for objects and other interactive objects on a home page of a website, accessed by said user.

3. The method of claim 2, further comprising:

sensing classes of objects to which the links and other interactive objects belong.

4. The method of claim 3, wherein said sensing is performed automatically.

5. The method of claim 1, further comprising:

registering, by said user, a preference for which of said objects are to be displayed, said displaying of said objects being based on said registering.

6. The method of claim 1, further comprising:

automatically prioritizing parts of a Web service associated with said web page that are repeatedly used by said user.

7. The method of claim 1, further comprising:

automatically deprioritizing parts of a Web service associated with said web page that are used less than said predetermined amount of times by said user.

8. The method of claim 6, further comprising:

splitting said web page into at least one page based upon a usage criteria specified.

9. The method of claim 7, further comprising:

splitting said web page into at least one page based upon a usage criteria specified.

10. The method of claim 8, wherein said splitting comprises:

splitting into pages on a basis of classes with each page comprising parts of at least one class.

11. The method of claim 9, wherein said splitting comprises:

splitting into pages on a basis of classes with each page comprising parts of at least one class.

12. The method of claim 6, wherein said prioritizing is based on structural information on pages representing said web service, said structure information having a hypertext mark-up language (HTML) format.

13. The method of claim 6, wherein said prioritizing is based on structural information on pages representing said web service, said structure information having other than a hypertext mark-up language (HTML) format.

14. The method of claim 9, further comprising:

linking split pages such that said user may selectively launch said services that the user has used less than said predetermined number of times previously.

15. The method of claim 1, further comprising:

creating multiple links at each level of a hierarchy of said Web page such that said user can go between parts used more than said predetermined number of times and parts used less than said predetermined number of times.

16. The method of claim 1, wherein said displaying comprises:
    displaying links as pictorial forms that are thumbnail forms of said web page, thereby providing said user with a visual cue as to whether said link should be followed.

17. The method of claim 1, further comprising:
    bypassing said one of displaying only those objects, on user request, so that said user sees said page as served by a server.

18. The method of claim 1, further comprising:
    registering, by said user, a browser to be accessed through a proxy server.

19. The method of claim 1, further comprising:
    tracking a plurality of different users.

20. The method of claim 1, further comprising:
    tracking a plurality of different web services.

21. The method of claim 1, further comprising:
    specifying, by said user, at least one of a different threshold and a different criteria for identifying a frequent accessing of said objects.

22. The method of claim 21, further comprising:
    tracking of said frequent accessing by maintaining information and transforming an original page based upon structure links.

23. The method of claim 1, further comprising:
    identifying a session of a user with a web service.

24. The method of claim 1, further comprising:
    maintaining a repository of user usage of a web service by updating previous visits with new visits based upon at least one of web page structure, user clicks and input, and user customization.

25. The method of claim 1, further comprising:
    using an extensible markup language (XML)-based schema language for specifying an update to a visit history.

26. The method of claim 1, further comprising:
    registering, by the user, a browser of the user with a customizing service.

27. The method of claim 26, wherein said user specifies, in the browser, visits to which sites should go through the customizing service, such that when the user tries to access a registered site from the browser, a downloaded page is intercepted by the customizing service and a structural information on the page is examined by the customizing service.

28. The method of claim 1, wherein only links and structures, used by said user said predetermined number of times or specified by said user, are placed on a home page of a website, other pages of said website being available through an indirect link.

29. The method of claim 1, further comprising:
    providing an image object on said web page for allowing the user to visit at least a portion of at least one of a rest of classes and a rest of pages associated with said web page, by said user clicking on said image.

30. The method of claim 29, further comprising:
    creating a hyperlink out of an icon corresponding to the image represented by at least one of the rest of the classes and the rest of the pages, such that said user obtains a thumbnail of said at least one of the rest of the classes and pages associated with said web page.

31. The method of claim 1, further comprising registering a customization of said user, said registering comprising:
    specifying a universal resource locator of the web page and optionally a set of universal resource locator (URL) patterns to indicate link patterns;
    specifying a threshold for the customization, for informing after how many uses of the web service the customization of the service for the user should commence; and
    automatically introducing into a browser of the user, options for asking the browser to go via a customizer service when accessing the URL for the service that the user specified.

32. The method of claim 1, further comprising:
    invoking, by said user, a web browser;
    specifying a universal resource locator (URL);
    determining whether said URL is a registered URL; and
    if the URL is determined to be a registered URL, then the browser visiting the page through a customizing proxy server, and if not then the browser visiting the site, said browser receiving the page at least one of either directly from a server and from the customizing proxy server and serving the page to the user.

33. The method of claim 1, wherein customizing of said web page comprises:
    receiving a universal resource locator (URL) request from a web browser of said user;
    sending a request to the web server corresponding to the URL and obtaining the page;
    comparing with a database of (user, service) pairs whether the URL is a service URL registered by the user, and if said URL is registered by said user, determining whether a number of visits to the web service by the user has exceeded said predetermined number of times;
    if the predetermined number is exceeded, then accessing an access history of the user for the web service from the database and customizing the web page based upon the access history, to create a modified page, and returning a modified page to the browser;
    if the predetermined number is not exceeded, then incrementing an access count by said user to the service and returning the page to the browser; and
    if said URL matches an access pattern within a service URL structure, updating a visit history for the access pattern for the registered web service and returning the page to the user's browser.

34. The method of claim 33, wherein for each web service URL, an extensible mark-up language (XML) document is stored representing a structure of the document.

35. The method of claim 30, wherein as the user visits the website repeatedly, the XML document is updated to specify which parts of the page structure were accessed.

36. A method of selectively tracking of web service usage by a user, comprising:
    sensing a number of times a user visits a website;
    sensing links for objects and other interactive objects on a home page of the website, accessed by the user; and
    displaying only those objects which the user accesses a predetermined number of times,
    wherein if at least one of a number of visits to a web site is determined to exceed said predetermined number of times and if the user has specified the user's preferences in advance, the next time the user visits the site, the user obtains a version of the site that has been customized to the user's previous visits, such that a browser of the user does not download text and graphics that are not used by the user said predetermined number of times.

37. The method of claim 36, further comprising:
    sensing classes of objects to which the links and other interactive objects belong.

38. A system for displaying predetermined objects on a web page accessed by a user, comprising:
- a sensor for sensing whether a web page has been accessed by said user; and
- a display for displaying one of only those objects of said web page which said user has accessed a predetermined number of times previously, and only those objects of said web page which said user has specified in advance,
- wherein if at least one of a number of visits to a web site is determined to exceed said predetermined number of times and if the user has specified the user's preferences in advance, the next time the user visits the site, the user obtains a version of the site that has been customized to the user's previous visits, such that a browser of the user does not download text and graphics that are not used by the user said predetermined number of times.

39. A system for selectively tracking web service usage by a user, comprising:
- means for sensing a number of times a user visits website;
- means for sensing links for objects and other interactive objects on a home page of the website, accessed by the user; and
- a display for displaying only those objects which the user has accessed a predetermined number of times previously,
- wherein if at least one of a number of visits to a web site is determined to exceed said predetermined number of times and if the user has specified the user's preferences in advance, the next time the user visits the site, the user obtains a version of the site that has been customized to the user's previous visits, such that a browser of the user does not download text and graphics that are not used by the user said predetermined number of times.

40. The system of claim 39, further comprising:
- means for sensing classes of objects to which the links and the other interactive objects belong.

41. A signal-bearing medium tangibly embodying a program of machine-readable instructions executable by a digital processing apparatus to perform a method of displaying predetermined objects on a web page accessed by a user, said method comprising:
- one of displaying only those objects of said web page which said user has accessed a predetermined number of times, and displaying only those objects of said web page which said user has specified in advance,
- wherein if at least one of a number of visits to a web site is determined to exceed said predetermined number of times and if the user has specified the user's preferences in advance, the next time the user visits the site, the user obtains a version of the site that has been customized to the user's previous visits, such that a browser of the user does not download text and graphics that are not used by the user said predetermined number of times.

42. A signal-bearing medium tangibly embodying a program of machine-readable instructions executable by a digital processing apparatus to perform a method of selectively tracking of web service usage by a user, said method comprising:
- sensing a number of times a user visits a website;
- sensing links for objects and other interactive objects on a home page of the website, accessed by the user; and
- displaying only those objects which the user accesses a predetermined number of times,
- wherein if at least one of a number of visits to a web site is determined to exceed said predetermined number of times and if the user has specified the user's preferences in advance, the next time the user visits the site, the user obtains a version of the site that has been customized to the user's previous visits, such that a browser of the user does not download text and graphics that are not used by the user said predetermined number of times.

43. The medium of claim 42, further comprising:
- sensing classes of objects to which the links and other interactive objects belong.

* * * * *